(12) United States Patent
Yokouchi et al.

(10) Patent No.: US 8,899,668 B2
(45) Date of Patent: Dec. 2, 2014

(54) AIR GUIDE STRUCTURE FOR SADDLE TYPE VEHICLE

(71) Applicant: Honda Motor Co., Ltd., Tokyo (JP)

(72) Inventors: Kohei Yokouchi, Wako (JP); Tomotake Shimoji, Wako (JP); Hiroyuki Sasazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/841,547

(22) Filed: Mar. 15, 2013

(65) Prior Publication Data

US 2013/0249239 A1 Sep. 26, 2013

(30) Foreign Application Priority Data

Mar. 22, 2012 (JP) ................. 2012-065165

(51) Int. Cl.
*B62J 17/04* (2006.01)
*B62J 17/00* (2006.01)
*B62J 17/02* (2006.01)
*B62D 35/00* (2006.01)
*H02J 1/00* (2006.01)

(52) U.S. Cl.
CPC ......... *B62D 35/005* (2013.01); *H02J 2001/004* (2013.01); *B62J 17/00* (2013.01); *B62J 17/02* (2013.01)
USPC .......... 296/208; 296/78.1; 296/180.1

(58) Field of Classification Search
CPC ................ B62J 17/02; B62J 17/04
USPC .......... 296/77.1, 180.1, 78.1, 91, 96.21, 208
See application file for complete search history.

(56) References Cited

U.S. PATENT DOCUMENTS

| 4,262,959 | A | * | 4/1981 | Saunders, IV | 296/78.1 |
| 4,709,774 | A | * | 12/1987 | Saito et al. | 180/229 |
| 4,911,494 | A | * | 3/1990 | Imai et al. | 296/78.1 |
| 5,330,029 | A | * | 7/1994 | Yoshimura et al. | 180/219 |
| 5,409,287 | A | * | 4/1995 | Suzuki | 296/180.1 |
| 6,217,100 | B1 | * | 4/2001 | Tanaka et al. | 296/78.1 |
| 6,979,039 | B2 | * | 12/2005 | Takemura et al. | 296/78.1 |
| 7,510,229 | B2 | * | 3/2009 | Katagiri et al. | 296/78.1 |
| 7,556,115 | B2 | * | 7/2009 | Iwanaga | 180/229 |
| 7,651,149 | B2 | * | 1/2010 | Matsuo et al. | 296/78.1 |
| 7,686,369 | B2 | * | 3/2010 | Matsuo et al. | 296/78.1 |
| 7,703,831 | B2 | * | 4/2010 | Matsuo et al. | 296/91 |
| 7,722,108 | B2 | * | 5/2010 | Ueda et al. | 296/78.1 |

(Continued)

FOREIGN PATENT DOCUMENTS

JP 2007-176297 A 7/2007

*Primary Examiner* — Gregory Blankenship
(74) *Attorney, Agent, or Firm* — Birch, Stewart, Kolasch & Birch, LLP

(57) ABSTRACT

An air guide structure for a saddle type vehicle for reducing the influence of a negative pressure on a rider. In an air guide structure for a motorcycle wherein a windscreen for the protection against air is provided on a front cover provided at a front portion of a vehicle body such that air is guided to the rear of the windscreen on the vehicle body to reduce a negative pressure to be generated behind the windscreen, an inlet port is provided between a central portion of a front end of the windscreen and the front cover. Further, a stepped portion that is formed stepwise in the forward and backward direction on an upper face of the front cover in the inside of the inlet port is provided, and a sectoral recessed portion is provided at a central portion of the stepped portion in the vehicle widthwise direction.

20 Claims, 14 Drawing Sheets

(56) References Cited

U.S. PATENT DOCUMENTS

| | | | |
|---|---|---|---|
| 7,878,571 B2* | 2/2011 | Misaki et al. | 296/78.1 |
| 8,123,273 B2* | 2/2012 | Tsuda et al. | 296/78.1 |
| 8,469,434 B2* | 6/2013 | Tsukui et al. | 296/78.1 |
| 8,540,304 B2* | 9/2013 | Kint | 296/180.1 |
| 2005/0110295 A1* | 5/2005 | Takemura et al. | 296/78.1 |
| 2008/0079285 A1* | 4/2008 | Ueda et al. | 296/180.1 |
| 2009/0108621 A1* | 4/2009 | Matsuo et al. | 296/91 |
| 2009/0189413 A1* | 7/2009 | Misaki et al. | 296/180.1 |
| 2013/0249238 A1* | 9/2013 | Yokouchi et al. | 296/180.1 |
| 2013/0249239 A1* | 9/2013 | Yokouchi et al. | 296/180.1 |

* cited by examiner

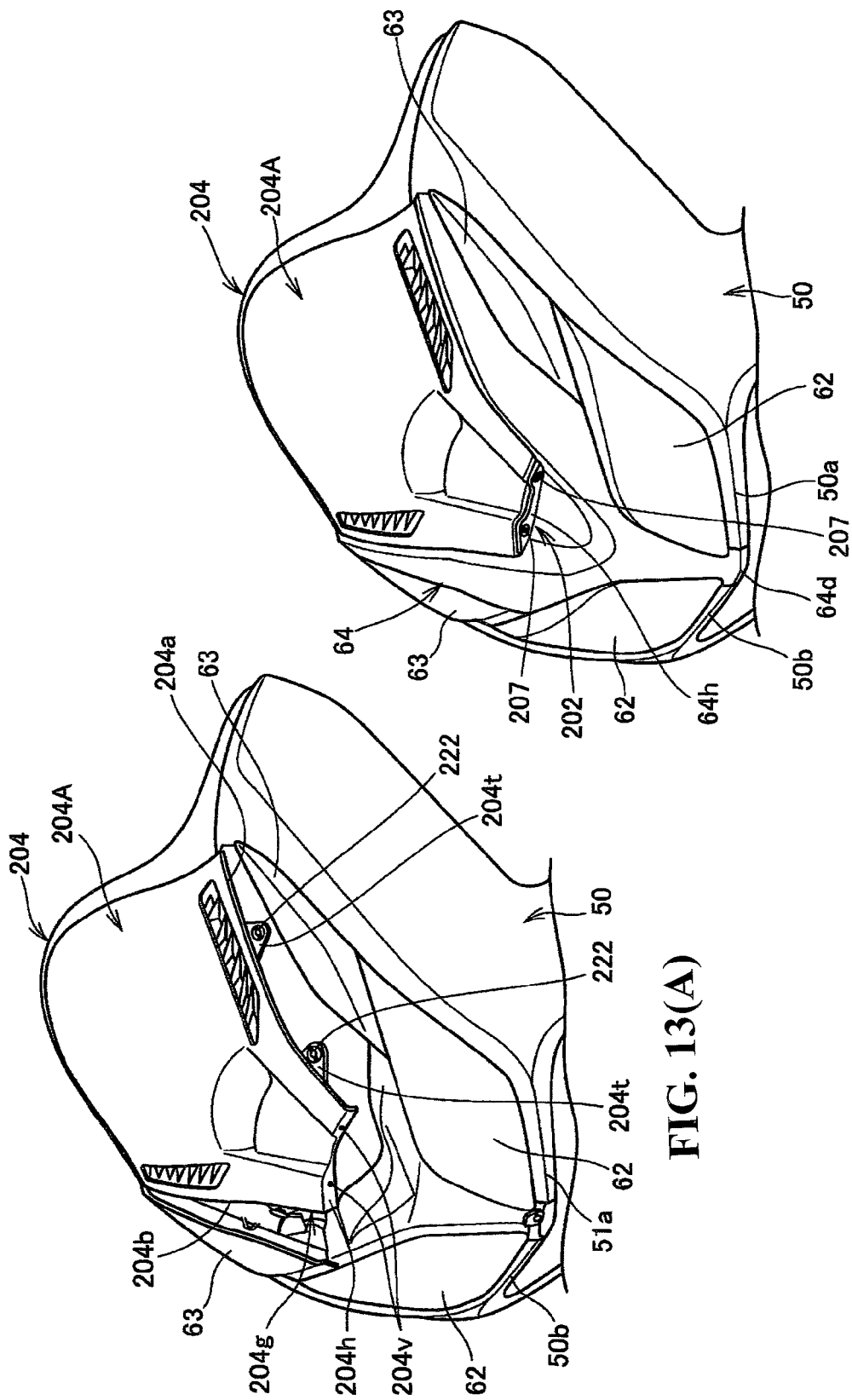

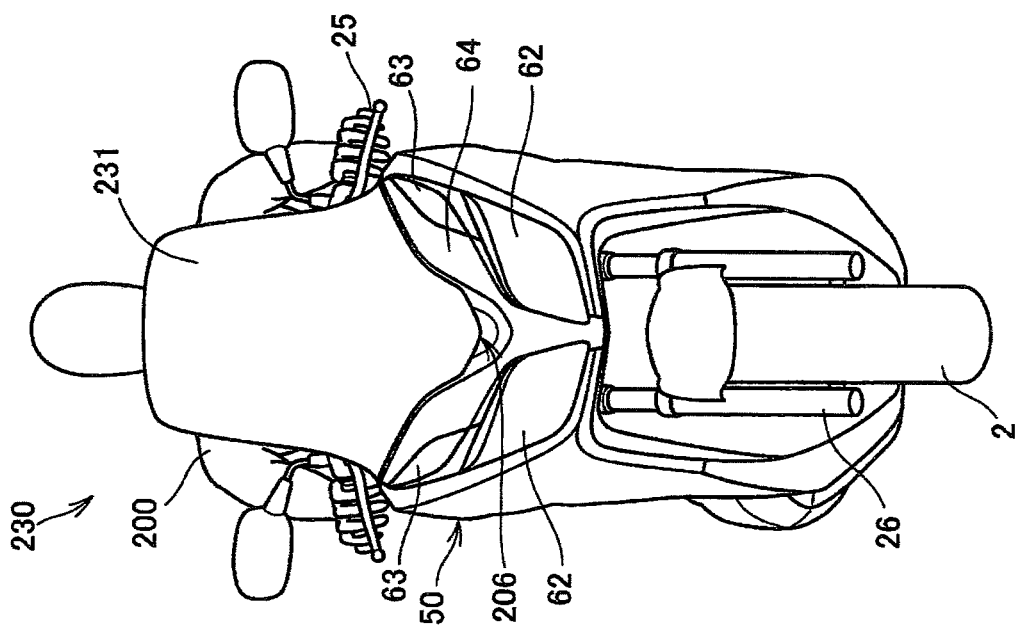
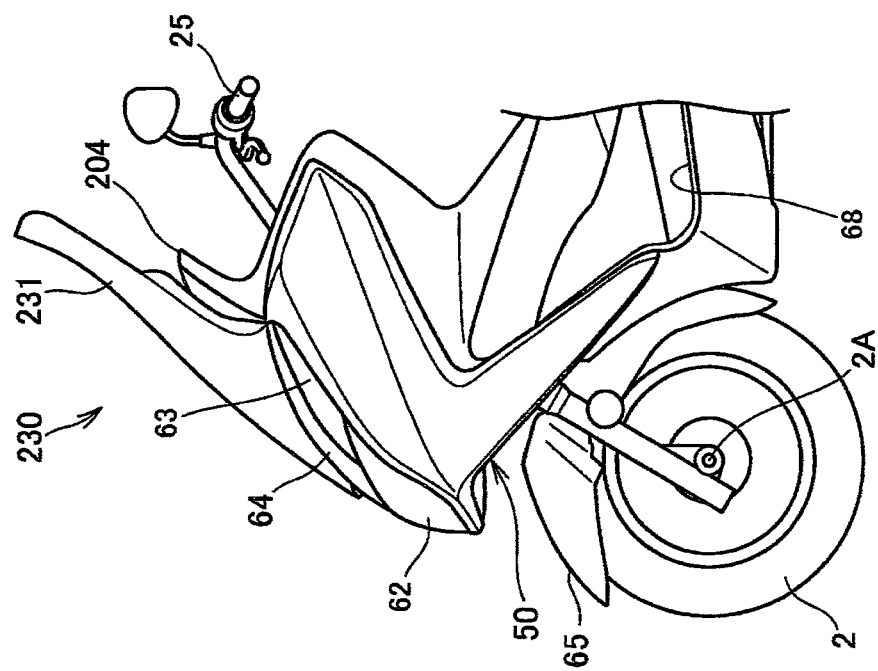

AIR GUIDE STRUCTURE FOR SADDLE TYPE VEHICLE

CROSS-REFERENCE TO RELATED APPLICATIONS

The present application claims priority under 35 USC 119 to Japanese Patent Application No. 2012-065165 filed Mar. 22, 2012 the entire contents of that are hereby incorporated by reference.

BACKGROUND OF THE INVENTION

1. Field of the Invention

The present invention relates to an air guide structure for a saddle type vehicle that suitably guides air to the rear of the vehicle with respect to a windscreen for protection from a flow of air against the vehicle.

2. Description of Background Art

A saddle type vehicle may include a windscreen for protecting a rider against a flow of air. During operation of the vehicle, a negative pressure is generated behind the windscreen on the vehicle. Therefore, a flow of air is caught up behind the windscreen on the vehicle by the negative pressure. Thus, the windscreen effect is degraded or air noise is liable to be generated. In addition, the rider who is positioned behind the windscreen on the vehicle is influenced by the negative pressure. Therefore, a countermeasure is taken to reduce the negative pressure by guiding air to the rear of the windscreen on the vehicle.

An air guide structure for a saddle type vehicle is known wherein an inlet port for a flow of air is provided below the windscreen and an air guide path is formed between the windscreen and the vehicle body such that the flow of air is guided to the rear side of the windscreen by the air guide path. See, for example, Japanese Patent Laid-Open No. 2007-176297.

In this air guide structure, a flow of air passes the air guide path from the inlet port and flows to the rear side of the windscreen from an outlet port.

Since the a flow of air is distributed to the overall area on the rear side of the windscreen in the vehicle widthwise direction through use of a straightening plate or depending upon the position of through-holes, the negative pressure over a wide range behind the windscreen is reduced.

When the influence of the negative pressure behind the windscreen described above is observed, it was found that the influence at a central portion of the rider in the vehicle widthwise direction is most significant. If a flow of air is guided to flow such that it is spread over the overall range in the vehicle widthwise direction behind the windscreen as in Japanese Patent Laid-Open No. 2007-176297, a sufficient negative pressure reduction effect for the rider cannot sometimes be obtained.

SUMMARY AND OBJECTS OF THE INVENTION

The present invention has been made in view of such a situation as described above. It is an object of an embodiment of the present invention to provide an air guide structure for a saddle type vehicle that can minimize the influence of a negative pressure upon a rider to raise the windscreen effect.

In order to solve the situation described above, there is provided an air guide structure for a saddle type vehicle wherein a windscreen (61, 231) for the protection against air is provided on a front cover (50) provided at a front portion of a vehicle body such that air is guided to the rear of the windscreen (61, 231) on the vehicle body to reduce a negative pressure to be generated behind the windscreen (61, 231). An inlet port (206) is provided between a central portion of a front end of the windscreen (61, 231). The front cover (50) and a stepped portion (204g) that is formed stepwise in the forward and backward direction on an upper face of the front cover (50) in the inside of the inlet port (206) is provided. In addition, a recessed portion (208) is provided at a central portion of the stepped portion (204g) in the vehicle widthwise direction.

According to an embodiment of the present invention, a flow of air taken into the inside of the inlet port can be collected to the center side of the vehicle body by the recessed portion provided at the central portion of the stepped portion in the vehicle widthwise direction. Therefore, while an air shielding effect is raised by the windscreen, a negative pressure generated behind the windscreen on the vehicle body and on the center side of the vehicle body can be reduced. Consequently, the influence of the negative pressure on the rider positioned behind the recessed portion can be reduced.

According to an embodiment of the present invention, an opening (204k) may be provided on the front cover (50) behind the recessed portion (208) in such a manner so as to be directed rearwardly of the vehicle body. According to an embodiment of the present invention, air in the inside of the front cover can be sucked out into the space behind the windscreen through the opening making use of the negative pressure generated between the windscreen and the front cover by guidance of air from the recessed portion. Consequently, the air guide amount can be assured to further reduce the negative pressure behind the windscreen.

According to an embodiment of the present invention, side openings (204m, 204n) may be provided at the opposite end portions of the front cover (50) in the vehicle widthwise direction, that are positions obliquely sidewardly and rearwardly of the recessed portion (208), in such a manner so as to be directed obliquely rearwardly and sidewardly of the vehicle body. With the present configuration, the negative pressure of any part of the rider other than the central portion in the vehicle widthwise direction such as the hands of the rider by which the handlebar is grasped can be reduced.

Further, according to an embodiment of the present invention, a garnish (64) that configures the front cover (50) may be fastened to the stepped portion (204g). According to an embodiment of the present invention, the holding rigidity of the garnish can be improved by the fastening of the front cover to the stepped portion.

Further, according to an embodiment of the present invention, the side openings (204m, 204n) may include a plurality of fins (204p) directed in the vehicle widthwise direction. According to an embodiment of the present invention, exposure of the internal structure of the front cover can be suppressed by the fins. Further, a flow of air can be introduced to the opposite end portions in the vehicle widthwise direction of the windscreen to raise the negative pressure reduction effect.

Further, according to an embodiment of the present invention, the stepped portion (204g) may be formed in an arc convex rearwardly as viewed in plan. With the present configuration, a flow of air can be collected readily to the recessed portion on the center side by the arcuate stepped portion, and the negative pressure effect can be further reduced.

Further, according to an embodiment of the present invention, a fastening section (202) provided on the stepped portion (204g) to the garnish (64) may overlap with the windscreen (61, 231) as viewed in front elevation. According to an embodiment of the present invention, since the fastening portion is not exposed to the appearance, the appearance can be improved. Further, since the inlet port can be utilized for the fastening, also the assembling property can be achieved.

Further, according to an embodiment of the present invention, upper edges of the opposite end portions of the stepped portion (204g) in the vehicle widthwise direction may be formed at the highest position. According to an embodiment of the present invention, the opposite end portions in the vehicle widthwise direction of the stepped portion serve as a high wall, by which a flow of air can be collected readily to the recessed portion.

According to an embodiment of the present invention, the inlet port is provided between the central portion of the front end of the windscreen and the front cover. The stepped portion is formed stepwise in the forward and backward direction on the upper face of the front cover in the inside of the inlet port. In addition, the recessed portion is provided at the central portion of the stepped portion in the vehicle widthwise direction. Therefore, a flow of air taken into the inside of the inlet port can be collected to the center side of the vehicle body by the recessed portion provided at the central portion of the stepped portion in the vehicle widthwise direction. Therefore, a negative pressure generated behind the windscreen on the vehicle body and on the center side of the vehicle body can be reduced. Consequently, the influence of the negative pressure on the rider positioned behind the recessed portion can be further reduced.

Further, the opening is provided on the front cover behind the recessed portion in such a manner as to be directed rearwardly of the vehicle body. Consequently, air in the inside of the front cover can be sucked out into the space behind the windscreen through the opening making use of the negative pressure generated between the windscreen and the front cover by guidance of air from the recessed portion. Consequently, the air guide amount can be assured to further reduce the negative pressure behind the windscreen.

Further, since the side openings are provided at the opposite end portions of the front cover in the vehicle widthwise direction, that are positions obliquely sidewardly and rearwardly of the recessed portion, in such a manner as to be directed obliquely rearwardly and sidewardly of the vehicle body. Therefore, the negative pressure at any portion of the rider other than the central portion in the vehicle widthwise direction such as the hands of the rider by which the handlebar is grasped can be reduced.

Further, since the garnish that configures the front cover is fastened to the stepped portion, the holding rigidity of the garnish can be improved by the fastening of the front cover to the stepped portion.

Further, since the side openings include the plurality of fins directed in the vehicle widthwise direction, exposure of the internal structure of the front cover can be suppressed by the fins. Further, a flow of air can be introduced to the opposite end portions in the vehicle widthwise direction of the windscreen to raise the negative pressure reduction effect.

Further, since the stepped portion is formed in an arc convex rearwardly as viewed in plan view, a flow of air can be collected readily to the recessed portion on the center side by the arcuate stepped portion, and the negative pressure effect can be further reduced.

Further, since the fastening portion provided on the stepped portion to the garnish overlaps with the windscreen as viewed in front elevation, the fastening portion is not exposed to the appearance. Consequently, the appearance can be improved. Further, since the inlet port can be utilized for the fastening, also the assembling property can be achieved.

Further, since the upper edges of the opposite end portions of the stepped portion in the vehicle widthwise direction are formed at the highest position, the opposite end portions in the vehicle widthwise direction of the stepped portion serve as a high wall, by which a flow of air can be collected readily to the recessed portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 13(A) and 13(B) are action views illustrating a manner in that a garnish is attached to a front portion of the vehicle body; and FIGS. 14(A) and 14(B) are schematic views showing a front portion of a saddle type vehicle to that a second embodiment of the present invention is applied.

DETAILED DESCRIPTION OF THE PREFERRED EMBODIMENTS

Figure 1:
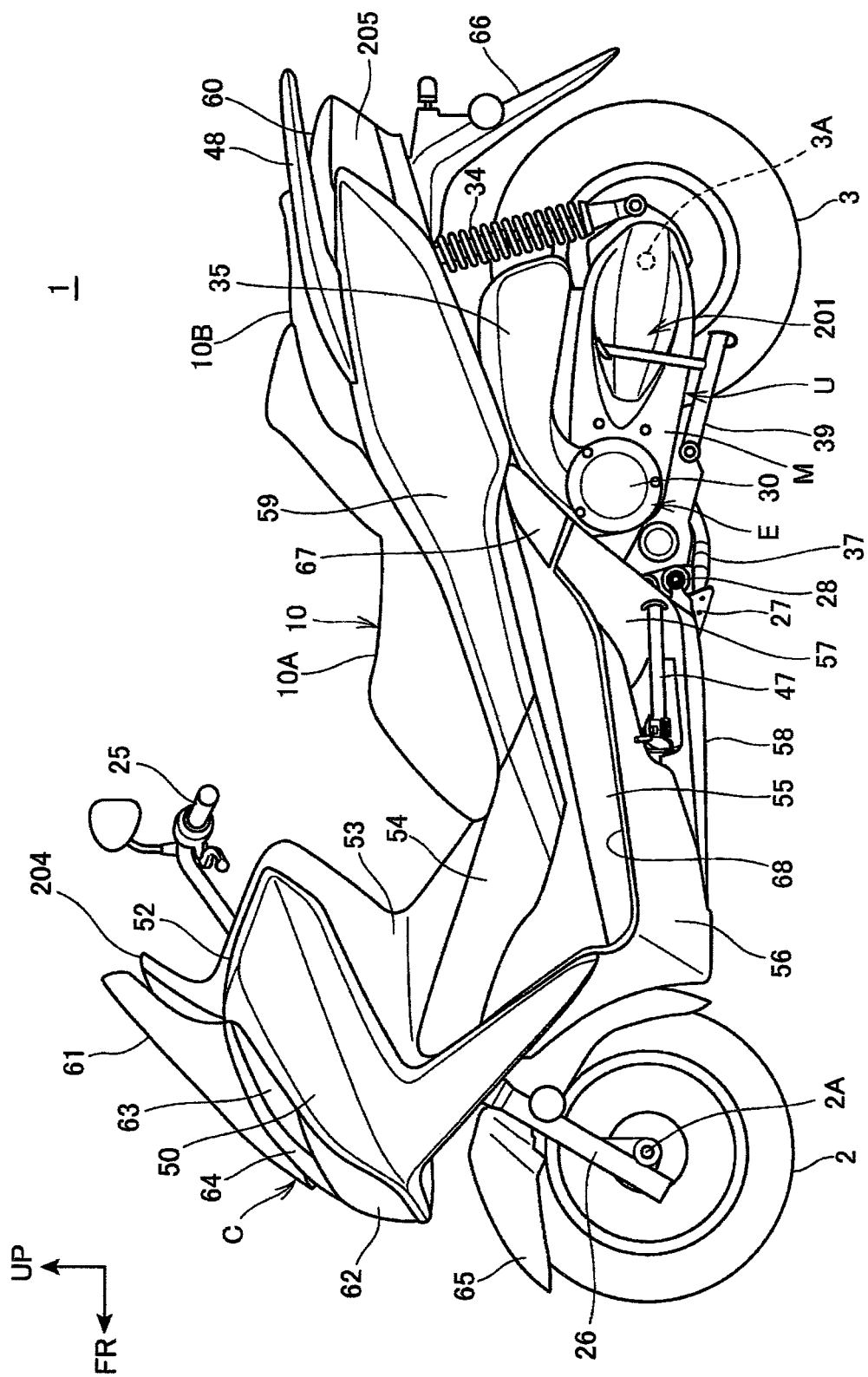
FIG. 1 is a left side elevational view showing a saddle type vehicle to that a first embodiment of the present invention is applied.

In the following, embodiments of the present invention are described with reference to the drawings. It is to be noted that, unless otherwise specified, the expressions of directions such as the forward and backward, leftward and rightward, and upward and downward directions in the following description are the same as those as viewed from the vehicle body. Further, reference character FR in the figures indicates the forward direction of the vehicle body, reference character UP the upward direction of the vehicle body, and reference character LE the leftward direction of the vehicle body.

FIG. 1 is a left side elevational view showing a motorcycle 1 to that a first embodiment of the present invention is applied.

The motorcycle 1 (saddle type vehicle) is a scooter type vehicle that includes a step floor 68 of the low floor type on which a rider seated on a seat 10 places his/her feet. The motorcycle 1 includes a front wheel 2 at a front portion of a vehicle body frame (not shown). A rear driving wheel 3 is supported for rotation on a unit swing engine U (unit swing power unit) disposed at the rear portion of the vehicle body. The vehicle body frame is covered with a vehicle body cover C made of resin.

A steering system for steering the front wheel 2 includes a steering shaft supported for pivotal motion on a head pipe that configures a front end portion of the vehicle body frame with a handlebar 25 being connected to an upper portion of the steering shaft. The steering shaft is connected at a lower end thereof to a pair of left and right front forks 26, 26 (only reference character 26 on the left side is shown), and the front wheel 2 is supported for rotation by an axle 2A provided at a lower end of the front forks 26, 26 and is steered by an operation of the handlebar 25.

The unit swing engine U is of the unit swing type wherein an engine E and a transmission case M, in which a belt type continuously variable transmission 201 is accommodated, are integrated. The unit swing engine U has a function also as a swing arm that supports the rear wheel 3. The unit swing engine U is connected to the vehicle body frame through a link member 27 connected to a front portion thereof and is upwardly and downwardly rockable around a pivot shaft 28 provided on the link member 27.

The engine E is a water-cooled four-cycle single cylinder engine and is disposed such that the cylinder axial line thereof extends forwardly substantially horizontally. The engine E is configured by coupling a cylinder and a cylinder head to each other on a front face of a crankcase 30 disposed at a front portion of the unit swing engine U. An intake pipe 37 is connected to an exhaust port on a lower face of the cylinder head. The intake pipe 37 extends rearwardly passing below the engine E and is connected to a muffler fixed to an outer side face of an arm portion hereinafter described.

The transmission case M extends rearwardly from a rear portion of the crankcase 30 passing the left side of the rear wheel 3. An arm portion is provided at a rear portion of the crankcase 30 and extends rearwardly passing the right side of the rear wheel 3. The rear wheel 3 is supported on an axle 3A provided between a rear portion of the transmission case M and a rear portion of the arm portion. Output power of the engine E is transmitted to the rear wheel 3 through the continuously variable transmission 201. A rear suspension 34 extends between each of a rear end of the transmission case M and a rear end of the arm portion and an upper portion of a rear portion of the vehicle body frame. An air cleaner box 35 for taking in external air is provided on an upper face of the transmission case M.

The air cleaner box 35 is connected to a throttle body connected to an intake port on an upper face of the cylinder head by a connecting tube not shown.

A main stand 39 is provided at a lower portion of a rear portion of the transmission case M for supporting the vehicle in an upwardly erected state. A side stand 47 is provided.

The seat 10 closes up an opening provided along an overall length of an upper face of an accommodating box disposed below the seat 10 such that it can open and close the opening. The seat 10 includes a front seat 10A on which a rider is to be seated. A rear seat 10B is formed higher by one stage than the front seat 10A and on which a pillion passenger is to be seated.

At a rear portion of a pair of left and right seat rails for configuring the vehicle body frame behind the accommodating box, a gram rail 48 is fixed.

The vehicle body cover C includes a front cover 50 for covering the head pipe from the front and from the left and right sides, a front lower cover (not shown) connected to a lower portion of the front cover 50 and positioned behind the front wheel 2, and an upper cover 52 connected to an upper portion of the front cover 50 below the handlebar 25. The vehicle body cover C further includes an upper inner cover 53 connected to left and right edge portions of the front cover 50, and a pair of left and right lower inner covers 54, 54 (only reference numeral 54 on the left side is shown) connected to a lower edge of the upper inner cover 53. The vehicle body cover C further includes a pair of left and right step covers 55, 55 (only reference numeral 55 on the left side is shown) connected to a lower portion of the front cover 50 and a lower edge of the lower inner covers 54, 54, and a pair of left and right front floor skirts 56, 56 (only reference numeral 56 on the left side is shown) connected to a lower portion of the front cover 50 and a lower portion of the step covers 55, 55. The vehicle body cover C further includes a pair of left and right rear floor skirts 57, 57 (only reference numeral 57 on the left side is shown) extending rearwardly continuously to the front floor skirts 56, 56, and an undercover 58 that covers the vehicle body from below. The vehicle body cover C further includes a pair of left and right body side covers 59, 59 (only reference numeral 59 on the left side is shown) connected to a rear portion of the lower inner covers 54, 54 and the step covers 55, 55, and a tail cover 60 connected to a rear portion of the body side covers 59, 59.

The step floor 68 on which the rider seated on the front seat 10A is to place his/her foot is formed at a bottom portion of each of the left and right step covers 55, 55.

A windscreen 61 is provided at a front portion of the front cover 50 and extends rearwardly and upwardly to protect the rider against a flow of air. A pair of left and right headlamps 62, 62 (only reference numeral 62 on the left side is shown) are provided at a front end of the front cover 50, and a pair of left and right blinkers 63, 63 (only reference numeral 63 on the left side is shown) are provided continuously to an upper portion of the headlamps 62, 62. A garnish 64 (for configuring part of the front cover 50) in the form of a plate is provided between the headlamps 62, 62 and the windscreen 61.

A front fender 65 is provided on the front forks 26, 26 and covers the front wheel 2 from above. A rear fender 66 is provided below the body side covers 59, 59 and covers the rear wheel 3 from above.

A pair of left and right tandem steps 67, 67 (only reference numeral 67 on the left side is shown) of the collapsible type on which a pillion passenger of the rear seat 10B is to place his/her feet are supported on the vehicle body frame through stays.

A meter visor 204 (that is a part for configuring the front cover 50) is provided behind the windscreen 61 and covers meters provided forwardly of the handlebar 25 from the front to raise the visibility of the meters. A rear combination lamp 205 is provided.

Figure 2:
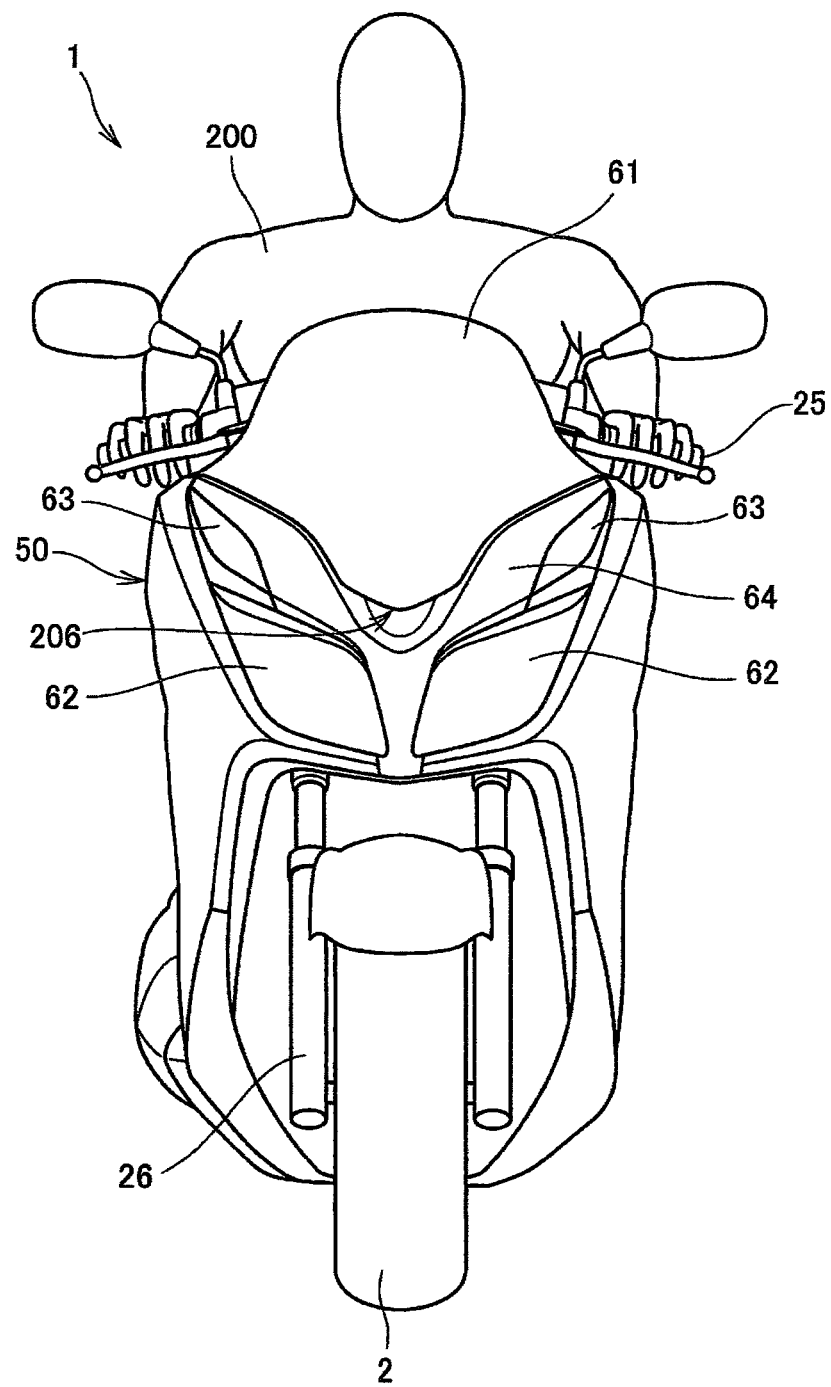
FIG. 2 is a front elevational view of the saddle type vehicle.

FIG. 2 is a front elevational view showing the motorcycle 1 and illustrates a state wherein a rider 200 rides on the motorcycle 1. The front cover 50 includes the left and right headlamps 62, 62, and the garnish 64 made of resin and disposed between the blinker 63, 63 and the windscreen 61. An inlet port 206 for guiding a flow of air to the rear of the windscreen 61 is formed between an upper portion of a central portion of the garnish 64 and a central portion of a lower end of the windscreen 61.

When the motorcycle 1 is operated, since the pressure behind the windscreen 61 becomes lower than that around the windscreen 61 and a negative pressure is generated behind the windscreen 61, a flow of air of a suitable amount is guided to the rear of the windscreen 61 from the inlet port 206 in order to reduce the negative pressure. This is intended to prevent such a situation wherein a flow of air is caught up to the rear of the windscreen 61 by the negative pressure, or air noise is generated at an edge of the windscreen 61 or the rider has an uncomfortable feeling from air from a side by the negative pressure. The face and the neck of the rider and the left and right hands of the rider by which the handlebar 25 is grasped are likely to be influenced by the negative pressure. Therefore, particularly by guiding air toward those portions, the influence of the negative pressure can be reduced effectively.

Figure 3:
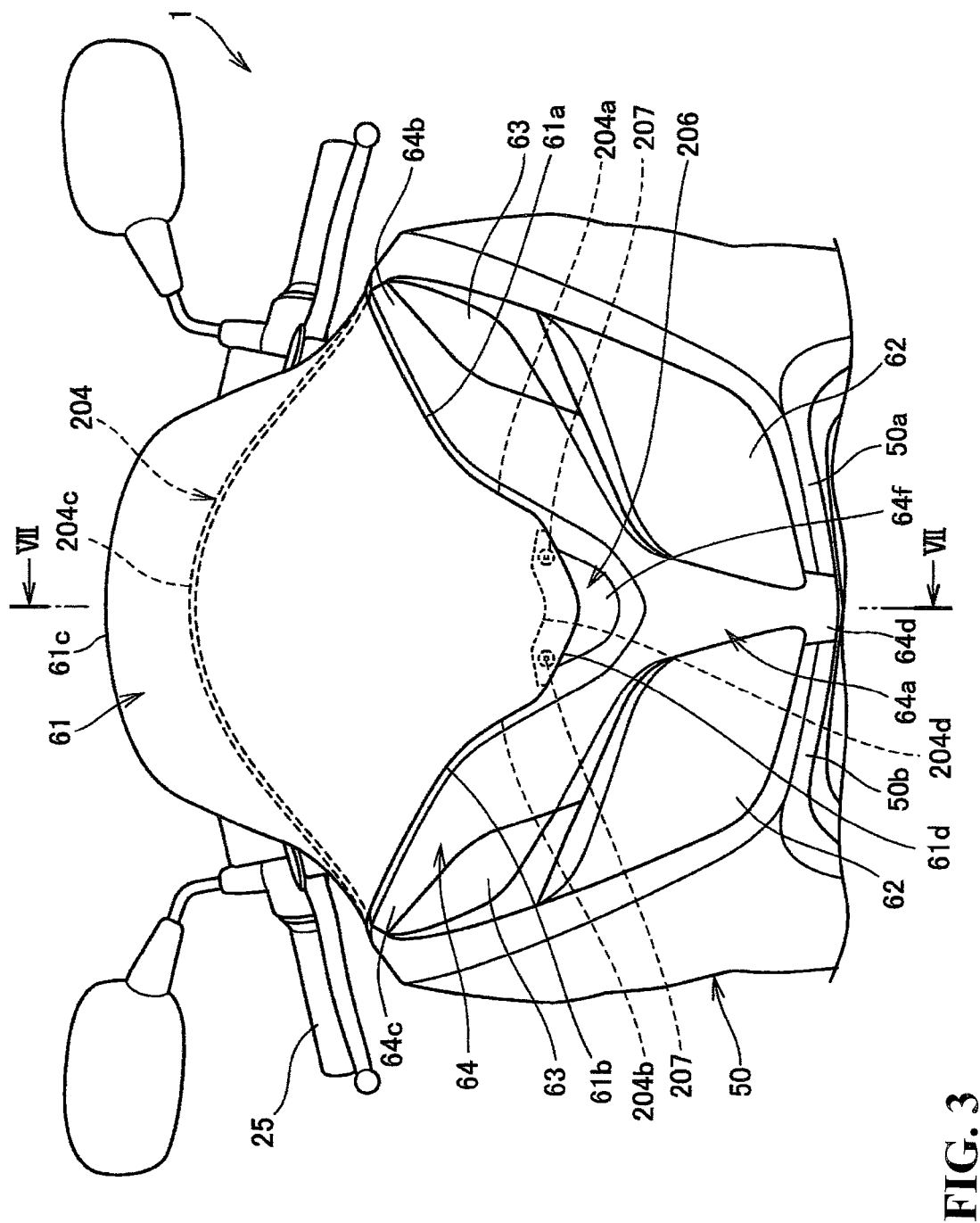
FIG. 3 is a front elevational view showing an essential part of the saddle type vehicle.

FIG. 3 is a front elevational view showing an essential part of the motorcycle 1.

The garnish 64 is a part of a Y shape as viewed in a front elevation surrounded by the windscreen 61 and headlamps 62 and blinkers 63 from above, the left and the right, respectively. The garnish 64 is formed by integral molding of a central extension 64a extending in an upward and downward direction at the center in the vehicle widthwise direction and left and right wing portions 64b and 64c extending obliquely upwardly sidewardly outwards from the left and the right of an upper portion of the central extension 64a.

The central extension 64a is inserted and fixed, at a lower end portion 64d thereof, in and to the rear side of an inner end portion of inner side extensions 50a and 50b extending inwardly in the vehicle widthwise direction from the left and right of the front cover 50. A depressed portion 64f for forming the inlet port 206 is formed at an upper portion of the central extension 64a.

The left and right wing portions 64b and 64c are disposed between the left and right headlamps 62, 62 and left and right blinkers 63, 63 and the windscreen 61 and are fixed.

The meter visor 204 is disposed on the rear side of the windscreen 61 on the inner side of the profile of the windscreen 61. A left edge 204a and a right edge 204b of the meter visor 204 substantially overlap with a left edge 61a and a right edge 61b of the windscreen 61 and an upper edge 204c of the meter visor 204 enters the lower side with respect to an upper edge 61c of the windscreen 61 while a lower edge 204d of the meter visor 204 enters the upper side with respect to a lower edge 61d of the windscreen 61.

The inlet port 206 is formed from the depressed portion 64f at the center of the garnish 64 and the lower edge 61d of the windscreen 61.

Figure 4:
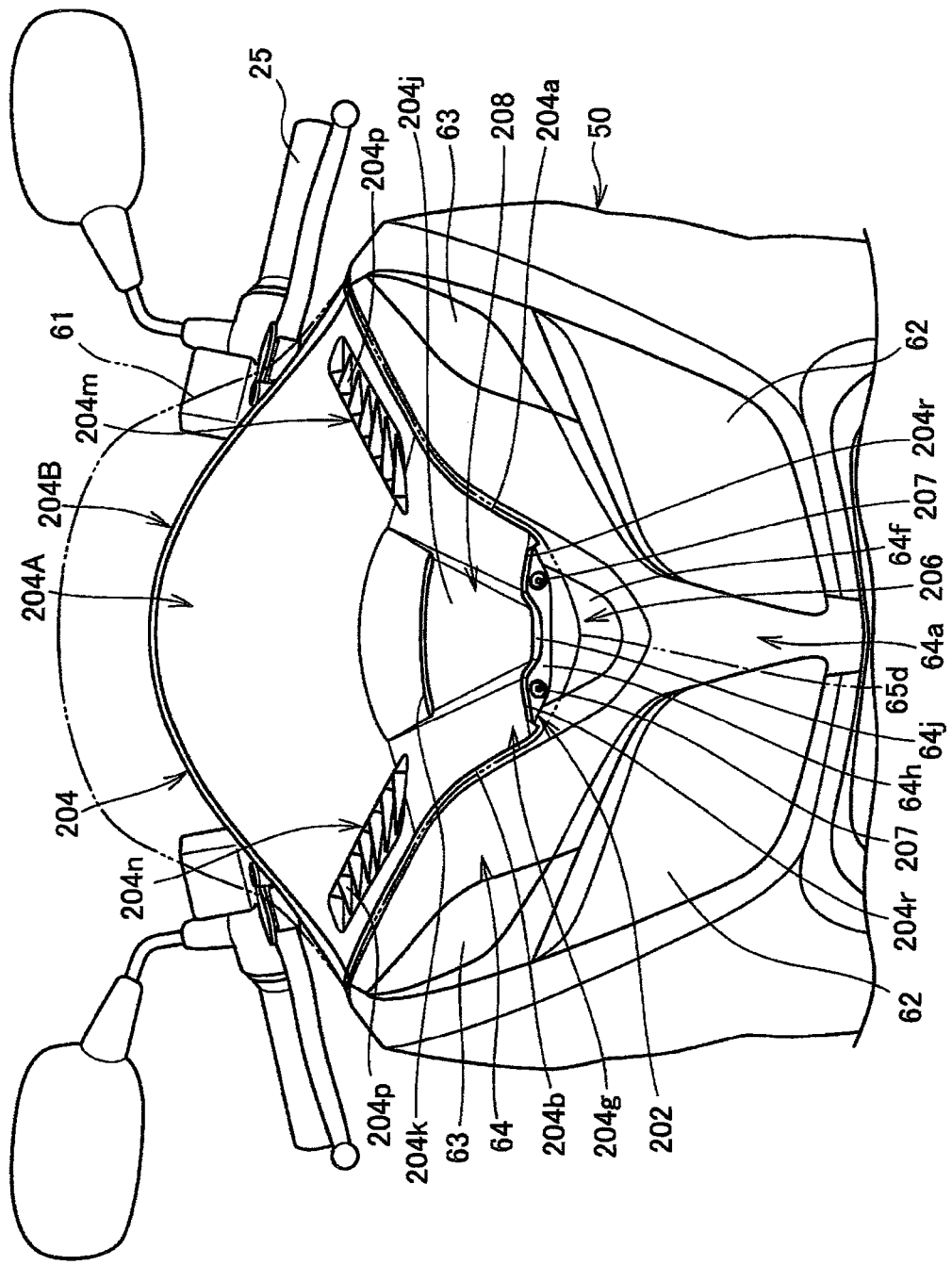
FIG. 4 is a front elevational view of an essential part of the saddle type vehicle illustrating a state wherein a windscreen is removed from the state of FIG. 3.

FIG. 4 is a front elevational view of an essential part illustrating a state wherein the windscreen 61 is removed from the state of FIG. 3.

The meter visor 204 includes a front side meter visor 204A disposed on the nearer side to the windscreen 61, and a rear side meter visor 204B disposed on the rear side of the front side meter visor 204A, namely, on the meter side.

The front side meter visor 204A has a stepped portion 204g formed at a front end portion thereof and having a difference in height in the forward and backward direction. The stepped portion 204g has a front wall 204h (refer to FIG. 13(A)) to that an upright wall 64h provided at an upper end portion of the central extension 64a of the garnish 64 is fixed by two bolts 207, 207. The front wall 204h and the upright wall 64h configure a fastening section 202 fastened by the bolts 207, 207.

The meter visor 204 and the garnish 64 have a sectoral recessed portion 208 formed at a central portion in the vehicle widthwise direction thereof in such a manner so as to extend obliquely upwardly and rearwardly and to extend to the outer side in the vehicle widthwise direction upwardly.

The sectoral recessed portion 208 is a portion that cooperates with the windscreen 61 to form therebetween an air guide path for guiding a flow of air taken in from the inlet port 206 to the rear side of the windscreen 61. The sectoral recessed portion 208 is configured from a meter visor recessed portion 204j formed at a front portion of the meter visor 204, and a garnish recessed portion 64j formed at an upper portion of the upright wall 64h of the garnish 64.

Further, a rear opening 204k is open behind the meter visor recessed portion 204j of the front side meter visor 204A. The rear opening 204k serves as a path along which air in the front cover 50 is taken in by a negative pressure that is generated in the space between the windscreen 61 and the meter visor 204 (screen rear side space 220 (refer to FIG. 7) hereinafter described).

Further, the front side meter visor 204A has a pair of left and right side openings 204m and 204n formed at obliquely rearward sidewardly outward positions of the meter visor recessed portion 204j. The side openings 204m and 204n serve as paths along which air in the front cover 50 is to be sucked by a negative pressure generated in the space between the windscreen 61 and the meter visor 204. More particularly, the side openings 204m and 204n are directed so as to guide a flow of air toward the opposite end sides of the windscreen 61 and reduce the negative pressure around the opposite end sides of the windscreen 61 thereby to suppress the influence of the negative pressure at and around the left and right hands of the rider by which the handlebar 25 is grasped thereby so that an air shielding effect is raised.

Referring to FIGS. 3 and 4, the front side meter visor 204A of the meter visor 204 includes protruding portions 204t, 204t (refer to FIG. 13(A)) provided on the left edge 204a and the right edge 204b thereof in such a manner so as to protrude sidewardly on the opposite sides in the vehicle widthwise direction. Further, the windscreen 61 has protruding portions (not shown) on the left edge 61a and the right edge 61b in such a manner so as to protrude sidewardly on the opposite sides in the vehicle widthwise direction similarly to the meter visor 204. The protruding portions 204t of the meter visor 204 and the protruding portions of the windscreen 61 are fastened together to a stay 216 (refer to FIG. 7) on the vehicle body side.

Figure 5:
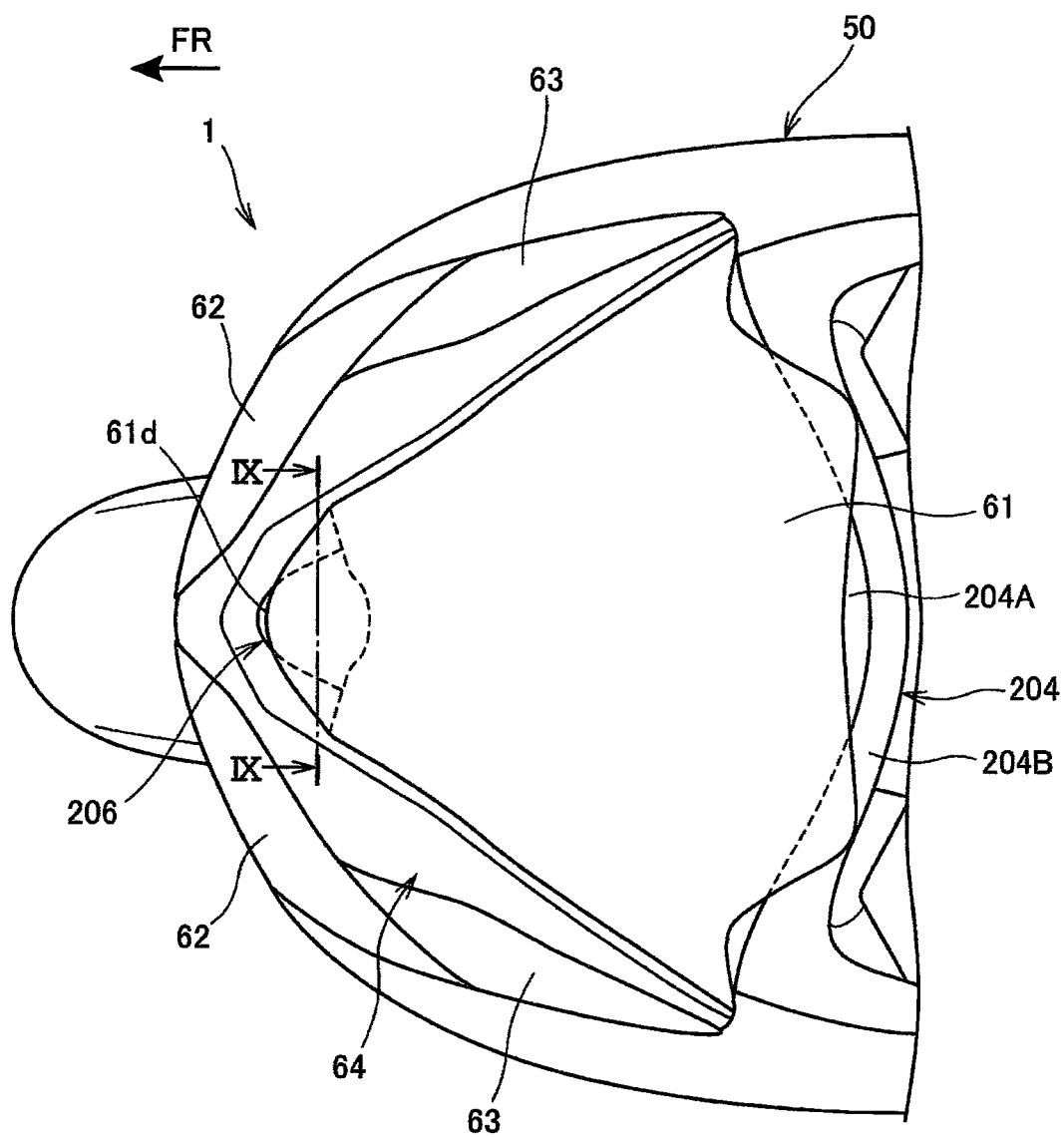
FIG. 5 is a plan view showing an essential part of the saddle type vehicle.
Figure 6:
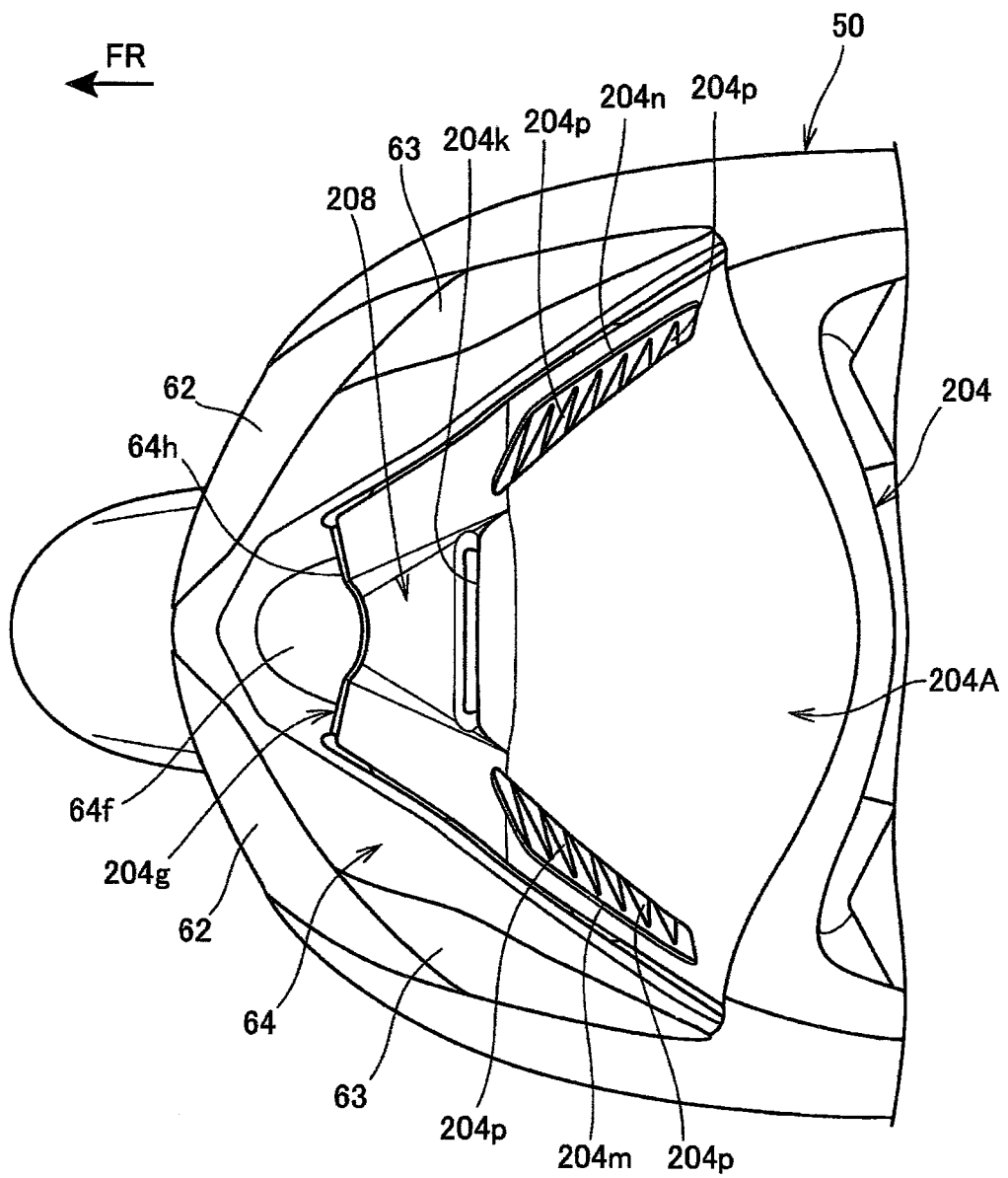
FIG. 6 is a plan view of an essential part of the saddle type vehicle illustrating a state wherein the windscreen is removed from the state of FIG. 5.

FIG. 5 is a plan view showing an essential part of the motorcycle 1. FIG. 6 is a plan view of an essential part illustrating a state wherein the windscreen 61 is removed from the state of FIG. 5.

As shown in FIGS. 5 and 6, the windscreen 61 is a part of a substantially isosceles triangular shape having a vertex angle disposed on the front side of the vehicle body as viewed in a plan view. The meter visor 204 is a part of a substantially sectoral shape, and the windscreen 61 covers the front side meter visor 204A of the meter visor 204 substantially entirely from above. More particularly, the sectoral recessed portion 208, rear opening 204k and side openings 204m and 204n are covered from above with the windscreen 61.

The side openings 204m and 204n include a plurality of fins 204p provided thereon and directed in the vehicle widthwise direction.

Figure 7:
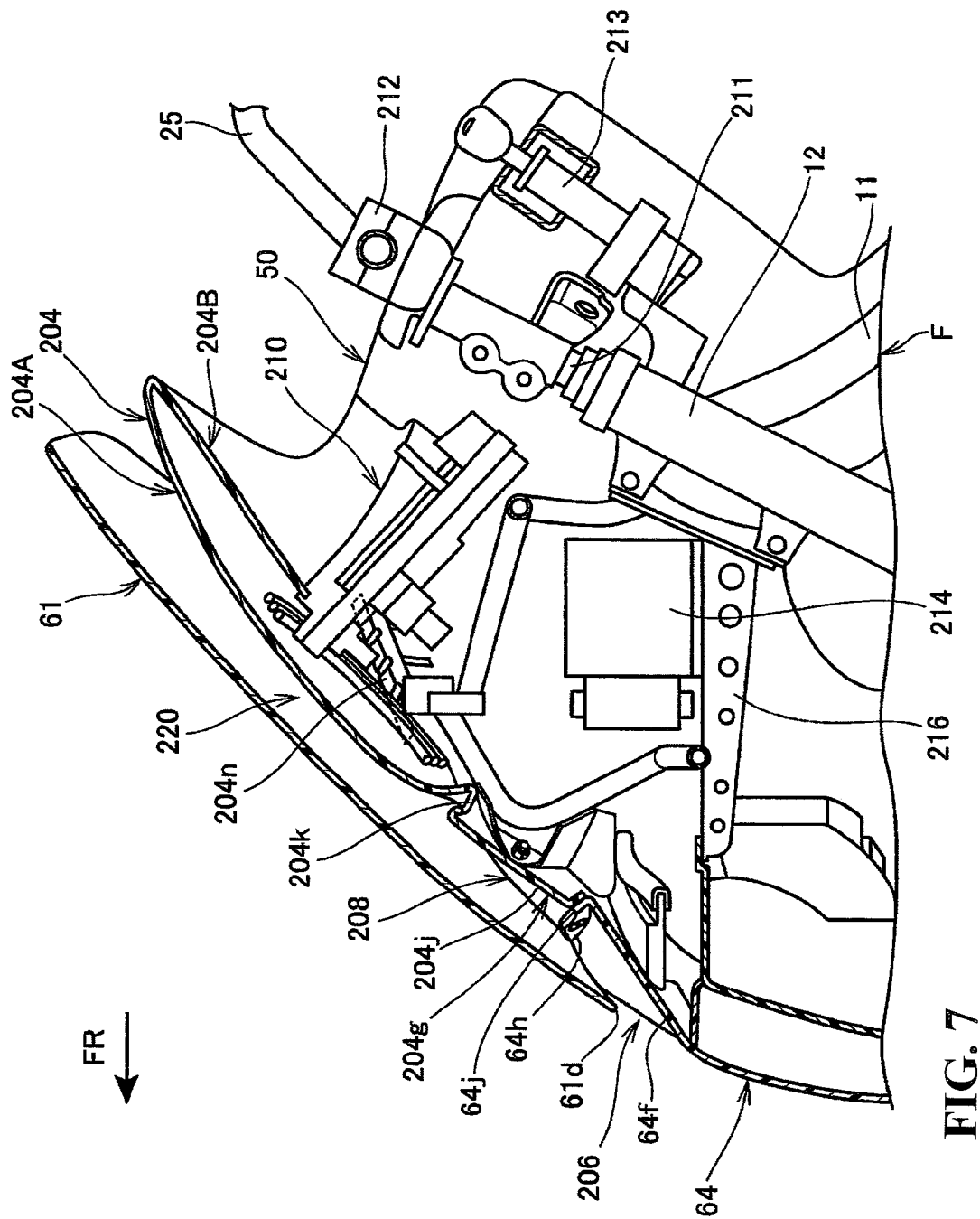
FIG. 7 is a sectional view taken along line VII-VII of FIG. 3.

FIG. 7 is a sectional view taken along line VII-VII of FIG. 3.

The screen rear side space 220 is formed between the windscreen 61 and the front side meter visor 204A of the meter visor 204 that configures the front cover 50. As a structure for guiding a flow of air into the screen rear side space 220, (1) the inlet port 206 is formed from the lower edge 61d of the windscreen 61 and the depressed portion 64f of the garnish 64; (2) the sectoral recessed portion 208 is formed from the garnish recessed portion 64j provided on the upright wall 64h of the garnish 64 and the meter visor recessed portion 204j extending obliquely rearwardly upwardly from the stepped portion 204g of the front side meter visor 204A; (3) the rear opening 204k is formed in the front side meter visor 204A behind the sectoral recessed portion 208; and (4) the side openings 204m and 204n (only reference character 204n is shown) are formed on the left and the right of the front side meter visor 204A. The rear side meter visor 204B covers a meter 210 from a forward direction.

A main frame 11 and a head pipe 12 configure the vehicle body frame F. The main frame 11 extends obliquely rearwardly and downwardly from the head pipe 12. A steering shaft 211 is supported for rotation on the head pipe 12 with a handlebar bracket 212 being attached to an upper end portion of a steering shaft 211 for supporting the handlebar 25. A main switch 213 is attached to the head pipe 12 with a hydraulic pressure generation apparatus 214 being provided for an ABS (Antilock Brake System) supported on the head pipe 12 through a stay 216.

Figure 8:
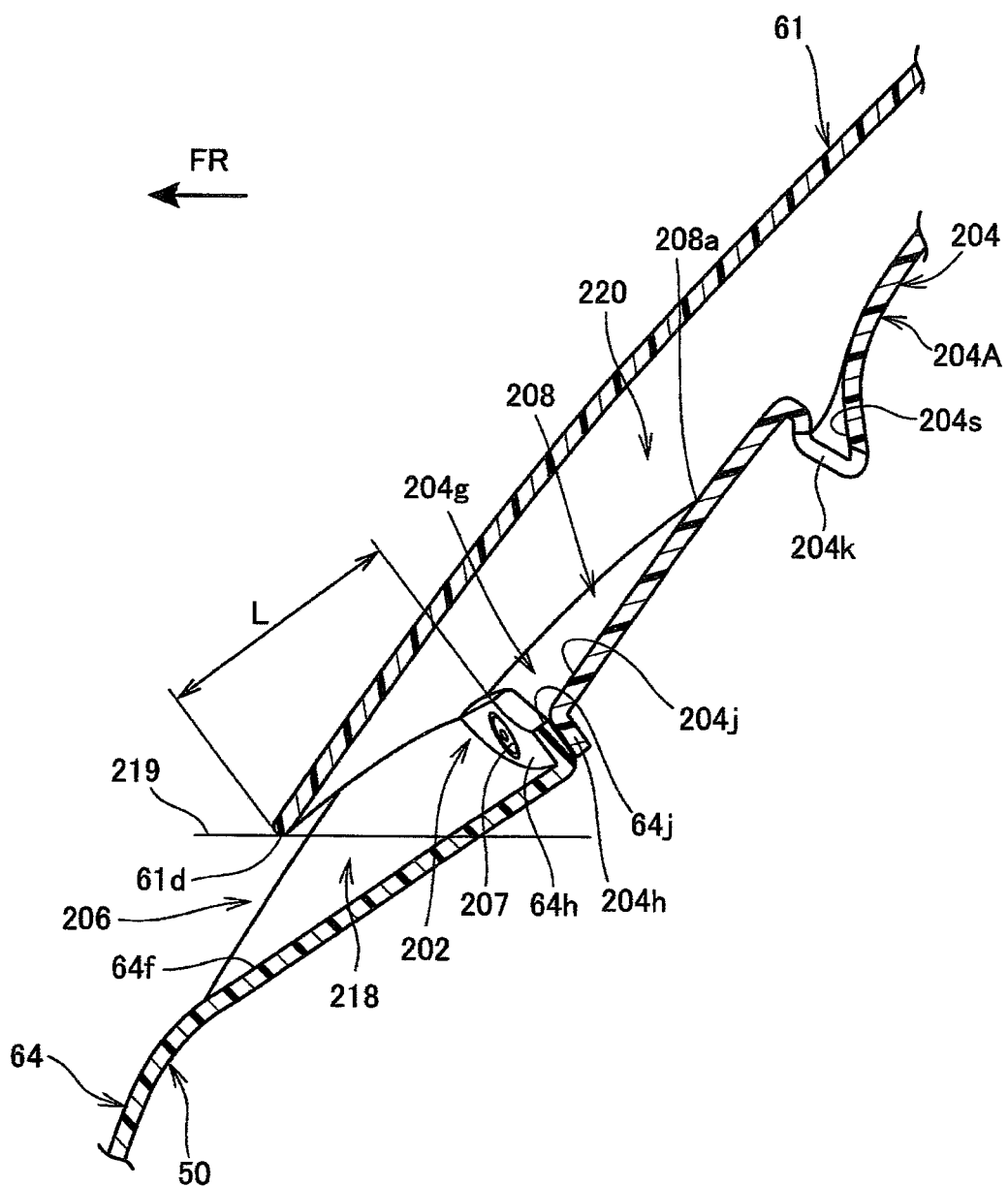
FIG. 8 is a sectional view an essential showing part of an air guide structure at a front portion of a vehicle body.

FIG. 8 is a sectional view showing an essential part of the air guide structure at a front portion of the vehicle body.

From the inlet port 206 formed from the lower edge 61d of the windscreen 61 and the depressed portion 64f of the garnish 64 to the upright wall 64h of the garnish 64, a flow of air introduction portion 218 that serves as a path into which a flow of air is introduced is formed in a rearwardly and upwardly inclined state. As illustrated in FIG. 8 a flow of air introduction portion 218 has an effective length L. Further, above a horizontal line 219 that is drawn such that it passes an end position of the lower edge 61d of the windscreen 61, the upright wall 64h of the garnish 64 and the stepped portion 204g of the meter visor 204 are provided.

The stepped portion 204g is a stepwise portion having an offset in the forward and backward direction formed from the upright wall 64h and the front wall 204h extending in the upward and downward direction in the garnish 64 and the meter visor 204 that configure the front cover 50, respectively, and an upper face of the front side meter visor 204A (including an upper face of the sectoral recessed portion 208) disposed substantially at a right angle to the upright wall 64h and the front wall 204h. In this manner, an offset is provided between the depressed portion 64f and the upper face of the front side meter visor 204A and the sectoral recessed portion 208 is provided at a central portion of the garnish 64 and the meter visor 204 in the vehicle widthwise direction to form an air guide path.

Since the a flow of air introduction portion 218 forms the rearwardly and upwardly inclined flow of air path having a predetermined length L and the upright wall 64h and the stepped portion 204g are provided upwardly with respect to the lower edge 61d of the windscreen 61 as described above, the bolts 207 for fixing the garnish 64 to the meter visor 204 go out of sight from the forward direction of the vehicle. Consequently, the appearance can be improved. Further, even if rain drops enter the a flow of air introduction portion 218 together with air, the speed of the rain drops is reduced before the rain drops come to the upright wall 64h of the garnish 64. Further, since the rain drops come to the upright wall 64h, they can be prevented from entering the screen rear side space 220 through the sectoral recessed portion 208.

The depth of the sectoral recessed portion 208 gradually decreases obliquely rearwardly and upwardly from the garnish recessed portion 64j, and a rear end 208a of the sectoral recessed portion 208 is positioned forwardly of the rear opening 204k. A rear recessed portion 204s is formed on the front side meter visor 204A behind the sectoral recessed portion 208 such that it extends in the vehicle widthwise direction, and the rear opening 204k is formed on the bottom of the rear recessed portion 204s such that it is directed obliquely upwardly and rearwardly. By directing the rear opening 204k obliquely upwardly and rearwardly in this manner, it is possible to allow air below the meter visor 204, namely, in the front cover 50, to smoothly flow from the rear opening 204k to the rear portion side of the screen rear side space 220.

Figure 9:
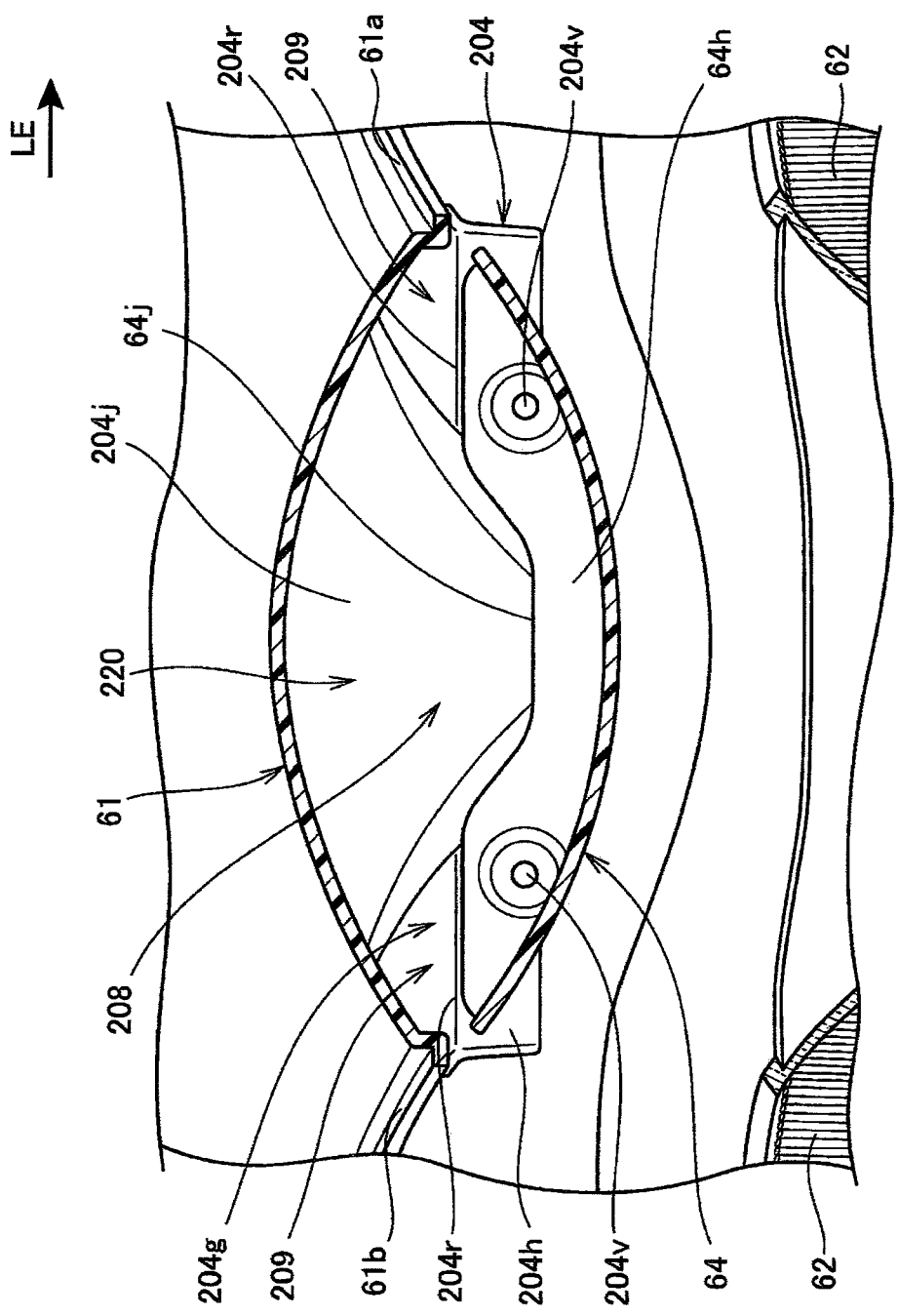
FIG. 9 is a sectional view taken along line IX-IX of FIG. 5.

FIG. 9 is a sectional view taken along line IX-IX of FIG. 5.

Of the stepped portion 204g of the meter visor 204, upper edges 204r, 204r at the opposite end portions in the vehicle widthwise direction are formed at the highest position. Also between the upper edges 204r, 204r and the windscreen 61, air guide paths 209, 209 for guiding a flow of air rearwardly are formed although the guide air amount therethrough is smaller than that through the sectoral recessed portion 208. The air guide paths 209, 209 configure part of the screen rear side space 220.

Action of the air guide structure of the motorcycle 1 described above is described below.

Figure 10:
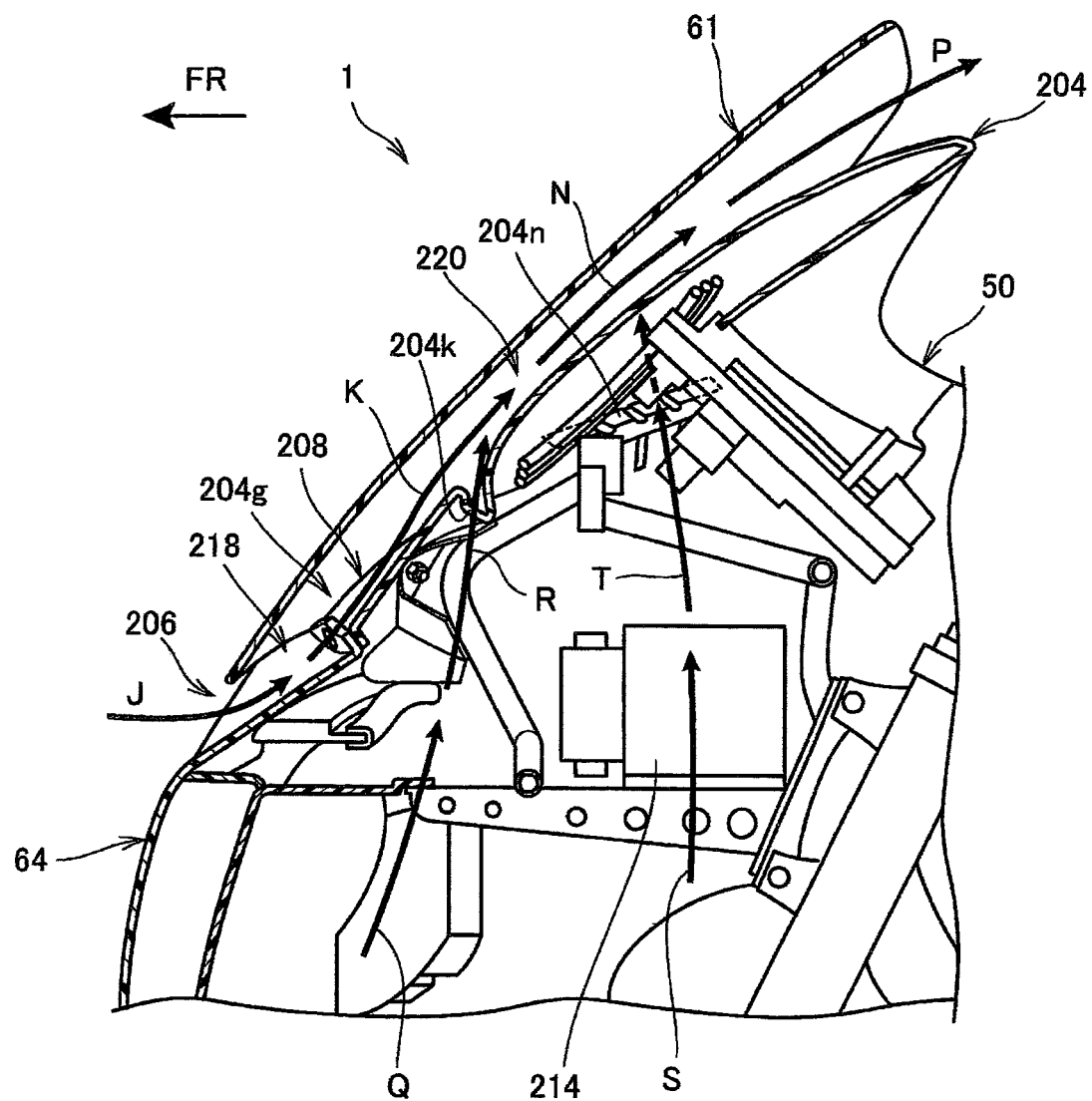
FIG. 10 is an action view in the form of a cross section of a front portion of the vehicle body illustrating action of the air guide structure.

FIG. 10 is an action diagram illustrating action of the air guide structure in the form of a sectional view at a front portion of the vehicle body.

During operation of the motorcycle 1, a flow of air enters the air introduction portion 218 from the inlet port 206 as indicated by an arrow marked J and comes to the screen rear side space 220 passing through the sectoral recessed portion 208 from the a flow of air introduction portion 218 as indicated by an arrow marked K. Then, the flow of air advances obliquely upwardly and rearwardly in the screen rear side space 220 as indicated by an arrow marked N and then advances to the external rider side from within the screen rear side space 220 as indicated by an arrow marked P.

When the a flow of air flows in the screen rear side space 220 as indicated by the arrows marked K and N, since the flow speed is high, a negative pressure is generated in the screen rear side space 220. Since this negative pressure is lower than the pressure in the front cover 50 in which a hydraulic pressure generation apparatus 214 for the ABS and so forth are disposed, the air in the front cover 50 moves to the rear opening 204k side as indicated by an arrow mark Q by the negative pressure. Then, the air passes through the rear opening 204k from within the front cover 50 and is sucked out into the screen rear side space 220 as indicated by an arrow mark R. Similarly, the air in the front cover 50 moves to the side openings 204m and 204n (only one reference character 204n is shown) as indicated by an arrow mark S and is sucked out into the screen rear side space 220 from within the front cover 50 through the side openings 204m and 204n as indicated by an arrow mark T. As a result, the air amount in the screen rear side space 220 increases, and this air advances to the external rider side.

Figure 11:
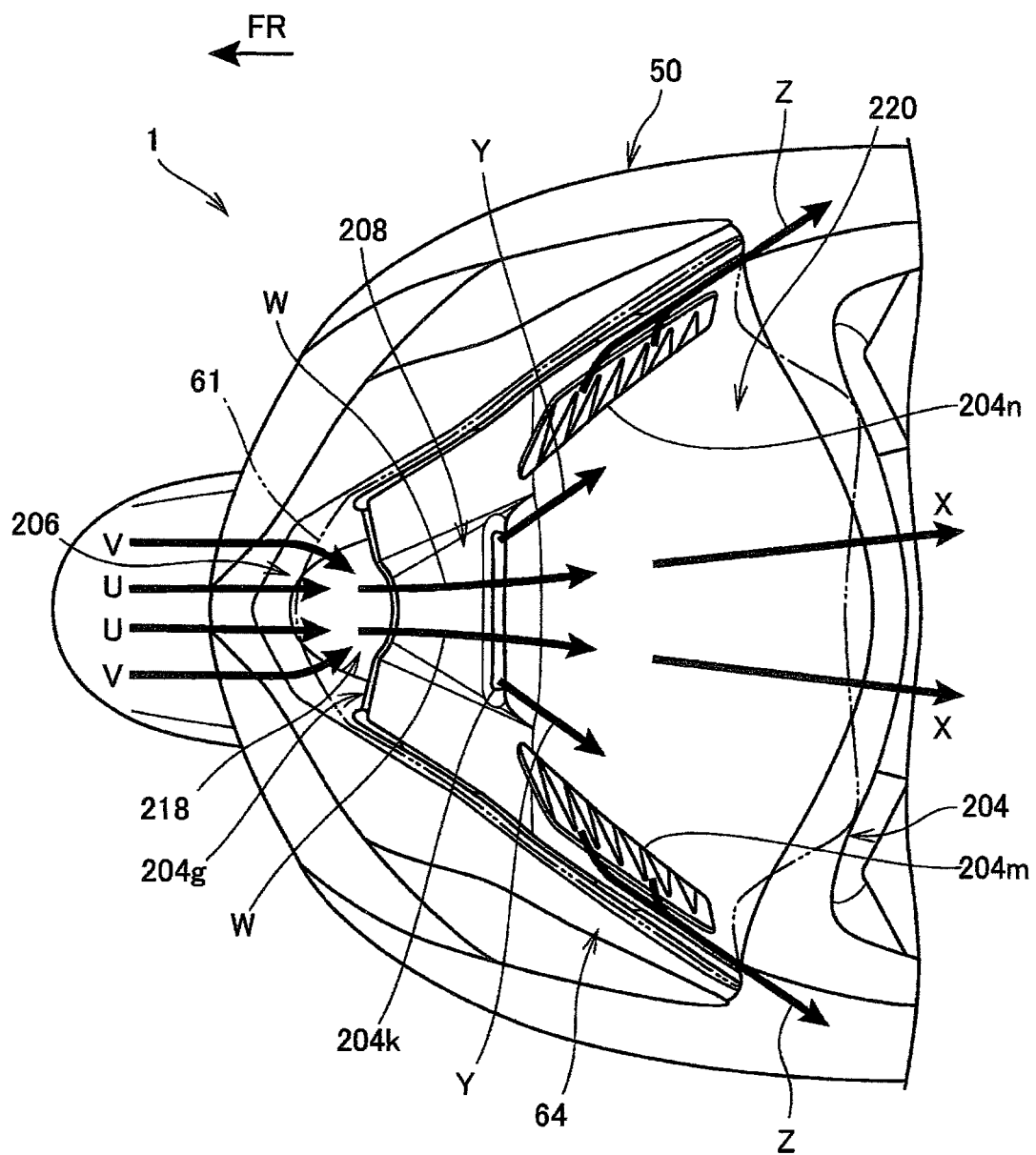
FIG. 11 is an action view in the form of a plan view illustrating action of the air guide structure.

FIG. 11 is an action diagram illustrating action of the air guide structure in the form of a plan view.

During operation of the motorcycle 1, a flow of air advances into the air introduction portion 218 from the inlet port 206 as indicated by arrows marked U, U, and around the opposite end portions of the stepped portion 204g in the vehicle widthwise direction, the a flow of air is collected to the sectoral recessed portion 208 side by the arcuate stepped portion 204g that is convex rearwardly as indicated by arrow marks V, V. Then, the a flow of air comes to the screen rear side space 220 from the air introduction portion 218 through the sectoral recessed portion 208 as indicated by arrow marks W, W. At this time, since the sectoral recessed portion 208 is expanded leftwardly and rightwardly at a rear portion thereof with respect to a front portion thereof, the flow of air is expanded leftwardly and rightwardly a little as indicated by arrows marked W, W. However, the amount of air flowing toward the center side in the vehicle widthwise direction is great in comparison with that in the other directions. Further, the flow of air advances from within the screen rear side space 220 to the external rider side as indicated by arrows marked X, X.

Further, the air sucked out from the rear opening 204k flows together with the flow of air indicated by the arrows marked W, W and is expanded leftwardly and rightwardly by a great amount and then advances to the outside of the screen rear side space 220 as indicated by arrows marked Y, Y.

Further, the air sucked out from the side openings 204m and 204n flows to the outside of the screen rear side space 220 along the left and right end portions of the screen rear side space 220 and advances toward the left and right hands of the rider gripping the handlebar and the periphery of the hands as indicated by arrows marked Z, Z.

Figure 12:
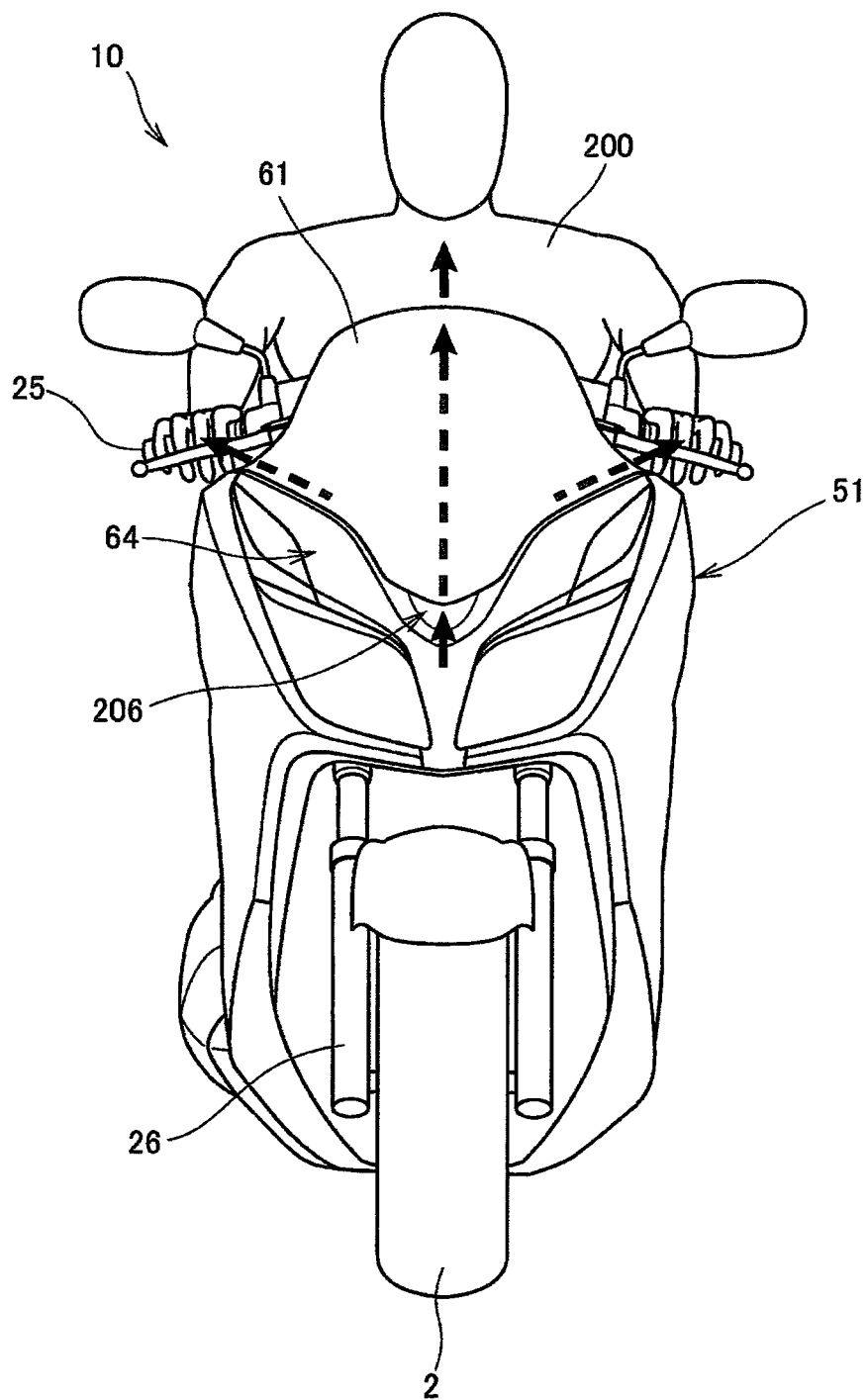
FIG. 12 is an action view in the form of a front elevational view illustrating action of the air guide structure.

FIG. 12 is an action diagram illustrating action of the air guide structure in the form of a front elevational view.

During operation of the motorcycle 1, a flow of air passes the path between the windscreen 61 and the front cover 50 behind the windscreen 61 from the inlet port 206 at a front portion of the vehicle body and is guided to the rear of the windscreen 61 as indicated by an arrow mark. Consequently, the negative pressure generated behind the windscreen 61 is reduced. As a result, the rider 200 positioned behind the windscreen 61 becomes less likely to be influenced by the negative pressure and can suppress catch-up of the flow of air flowing along the surface of the windscreen 61 to the rear side of the windscreen 61 thereby to raise the air shielding effect. Further, by receiving a suitable degree of air flow, the rider can be comfortable during operation of the vehicle.

FIGS. 13(A) and 13(B) are action diagrams illustrating a manner of attachment of the garnish 64 to a front portion of the vehicle body. More particularly, FIG. 13(A) is a perspective view of a front portion of the vehicle body before the garnish 64 is attached, and FIG. 13(B) is a perspective view of a front portion of the vehicle body after the garnish 64 is attached.

FIG. 13(A) illustrates a state wherein the front cover 50, headlamps 62, 62, blinkers 63, 63 and meter visor 204 are attached to the vehicle body frame side. In the front side meter visor 204A, the protruding portions 204t, 204t are provided such that they protrude sidewardly from the left edge 204a and the right edge 204b, respectively, and bolt insertion holes 204v, 204v are perforated in the front wall 204h of the stepped portion 204g into which the bolts 207, 207 (refer to FIG. 4) are to be inserted. A clip having female threads formed thereon is held by the front wall 204h.

Referring to FIG. 13(B), the lower end portion 64d of the garnish 64 is inserted and fixed, at left and right ends thereof, into and to the rear side of an inner end portion of the inner side extensions 50a and 50b of the front cover 50. Then, a plurality of locking pieces (not shown) projecting from the rear side of the garnish 64 are locked to the blinkers 63, 63, and finally, the bolts 207 are inserted into bolt insertion holes (not shown) provided on the upright wall 64h of the garnish 64. Further, an end of each of the bolts 207 is screwed into the corresponding female thread of the clip and the volts 207 are fitted into the corresponding bolt insertion hole 204v to fasten the upright wall 64h and the front wall 204h to each other. The attachment of the garnish 64 to the front portion of the vehicle body is completed thereby.

As shown in FIGS. 1, 4 and 8, in the air guide structure for a motorcycle 1 wherein the windscreen 61 for the protection against air is provided on the front cover 50 provided at a front portion of the vehicle body such that air is guided to the rear of the windscreen 61 on the vehicle body to reduce a negative pressure to be generated behind the windscreen 61, the inlet port 206 is provided between the central portion of the front end of the windscreen 61 and the front cover 50, and the stepped portion 204g that is formed stepwise in the forward and backward direction is provided on the upper face of the front cover 50 in the inside of the inlet port 206. In addition, the sectoral recessed portion 208 as the recessed portion is provided at the central portion of the stepped portion 204g in the vehicle widthwise direction.

According to this configuration, a flow of air taken into the inside of the inlet port 206 can be collected to the center side of the vehicle body by the sectoral recessed portion 208 provided at the central portion of the stepped portion 204g in the vehicle widthwise direction. Therefore, the negative pressure generated behind the windscreen 61 on the vehicle body and on the center side of the vehicle body can be reduced. Consequently, the influence of the negative pressure upon the rider 200 positioned rearwardly of the sectoral recessed portion 208 can be reduced.

Further, the rear opening 204k as an opening directed rearwardly of the vehicle body is provided in the front cover 50 behind the sectoral recessed portion 208. Therefore, air in the inside of the front cover 50 can be sucked out into the space (screen rear side space 220) behind the windscreen 61 through the rear opening 204k utilizing a negative pressure generated between the windscreen 61 and the front cover 50 (particularly the meter visor 204) by air guided from the sectoral recessed portion 208. Consequently, the guided air amount can be assured to further reduce the negative pressure behind the windscreen 61.

Further, the side openings 204m and 204n directed obliquely rearwardly and sidewardly of the vehicle body are provided at the opposite end portions in the vehicle widthwise direction of the front cover 50 that are positioned obliquely sidewardly and rearwardly of the sectoral recessed portion 208 as shown in FIG. 4. Therefore, the negative pressure at any place other than a central portion in the vehicle widthwise direction such as the proximity of the hands of the rider by that the handlebar 25 (refer to FIG. 2) is gripped can be reduced.

Further, since the garnish 64 that configures the front cover 50 is fastened to the stepped portion 204g as shown in FIGS. 13(A) and (B), the holding rigidity of the garnish 64 can be improved by the fastening of the front cover 50 to the stepped portion 204g.

Further, since the side openings 204m and 204n individually include the fins 204p directed in the vehicle widthwise direction as shown in FIGS. 4, 6 and 11, it is possible to suppress exposure of the internal structure of the meter visor 204 with the fins 204p. Further, it is possible to guide a flow of air to the opposite end portions in the vehicle widthwise direction of the windscreen 61 to raise the negative pressure reduction effect behind the windscreen 61.

Further, since the stepped portion 204g is formed in an arcuate shape convex rearwardly as viewed in a plan view, a flow of air can be collected readily to the sectoral recessed portion 208 on the center side by the arcuate stepped portion 204g. Consequently, the negative pressure effect behind the windscreen 61 can be further reduced.

Further, as shown in FIGS. 3, 4 and 8, since the fastening section 202 provided on the stepped portion 204g to the garnish 64 overlaps with the windscreen 61 as viewed in front elevation, the fastening section 202 is not exposed to an appearance. Therefore, the appearance of the motorcycle 1 can be improved. Further, since the inlet port 206 is utilized to insert a tool for turning the bolt 207 from the inlet port 206 to fasten the bolt 207, also the assembling property can be achieved.

Further, as shown in FIGS. 4 and 9, the upper edges 204r, 204r at the opposite end portions of the vehicle widthwise direction of the stepped portion 204g are formed at the highest position. Therefore, the opposite end portions in the vehicle widthwise direction of the stepped portion 204g serve as a high wall, by which a flow of air can be collected readily to the sectoral recessed portion 208.

FIGS. 14(A) and 14(B) are explanatory views showing a front portion of a motorcycle 230 to which a second embodiment of the present invention is applied. FIG. 14(A) is a left side elevational view and FIG. 14(B) is a front elevational view. Like components to those of the first embodiment shown in FIG. 1 are denoted by like reference characters, and detailed description is omitted.

As shown in of FIGS. 14(A) and (B), the motorcycle 230 (saddle type vehicle) includes a front cover 50 on which a vertically elongated windscreen 231 is provided such that it upwardly extends higher than the windscreen 61 in the first embodiment shown in FIG. 1.

A screen rear side space is provided between the windscreen 231 and a portion of the front cover 50 that is positioned rearwardly of the windscreen 231 thereby to adopt an air guide structure similar to that in the first embodiment. In such a windscreen 231 that has a great projection area from forwardly of the vehicle as described above, a high negative pressure is generated behind the windscreen 231 during operation of the motorcycle 230. Therefore, the negative pressure reduction effect becomes higher by adopting the air guide structure for guiding air into the space behind the screen.

As shown in FIGS. 14(A) and (B), in the air guide structure for a motorcycle 230 the windscreen 231 for the protection against air is provided on the front cover 50 provided at a front portion of the vehicle body such that air is guided to the rear of the windscreen 231 on the vehicle body to reduce a negative pressure to be generated behind the windscreen 231. The inlet port 206 is provided between the central portion of the front end of the windscreen 231 and the front cover 50. The stepped portion 204g (refer to FIGS. 4 and 8) is formed stepwise in the forward and backward direction on the upper face of the front cover 50 in the inside of the inlet port 206. In addition, the sectoral recessed portion 208 (refer to FIGS. 4 and 8) is provided at the central portion of the stepped portion 204g in the vehicle widthwise direction.

The embodiments described above indicate a mode of the present invention and can be modified and applied without departing from the subject matter of the present invention.

For example, while, in the embodiments described above, the bottom face (upper face) of the sectoral recessed portion 208 is provided at a position higher than the depressed portion 64f of the garnish 64 as shown in FIGS. 4 and 8, the position of the bottom face of the sectoral recessed portion 208 is not limited to this. In particular, the bottom face of the sectoral recessed portion 208 may be positioned flush with the depressed portion 64f of the garnish 64. This makes it possible to increase the sectional area of the path of the sectoral recessed portion 208. Thus, a flow of air can flow more smoothly in the sectoral recessed portion 208 from the air introduction portion 218. Consequently, the air amount to be taken into the screen rear side space 220 increases, and the negative pressure effect behind the windscreen 61 can be further reduced.

Further, while the sectoral recessed portion 208 has a sectoral shape as shown in FIG. 4, the shape of the sectoral recessed portion 208 is not limited to this, but the sectoral recessed portion 208 may be replaced by a recessed portion having left and right edge portions extending in parallel to each other in the forward and backward direction.

Further, the present invention can be applied not only to the motorcycles 1 and 230 but also to saddle type vehicles other than motorcycles. It is to be noted that a saddle type vehicle includes general vehicles of the type wherein a rider sits astride the vehicle body and particularly includes not only motorcycles (including bicycles with a prime mover) but also three-wheeled vehicles or four-wheeled vehicles classified into an ATV (All Terrain Vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An air guide structure for a saddle vehicle wherein a windscreen is mounted on a front cover provided at a front portion of a vehicle body such that air is guided to the rear of the windscreen on the vehicle body to reduce a negative pressure to be generated behind the windscreen, comprising:
   an inlet port provided between a central portion of a front end of the windscreen and the front cover;
   a stepped portion is formed stepwise in a forward and backward direction on an upper face of the front cover in an inside of the inlet port; and
   a recessed portion is provided at a central portion of the stepped portion in a vehicle widthwise direction;
   wherein a flow of air is guided to a rear of the windscreen for reducing a negative pressure formed behind the windscreen.

2. The air guide structure for a saddle vehicle according to claim 1, wherein an opening is provided on the front cover behind the recessed portion in such a manner so as to be directed rearwardly of the vehicle body.

3. The air guide structure for a saddle vehicle according to claim 1, wherein side openings are provided at opposite end portions of the front cover in a vehicle widthwise direction, that are positions obliquely sidewardly and rearwardly of the recessed portion, in such a manner so as to be directed obliquely rearwardly and sidewardly of the vehicle body.

4. The air guide structure for a saddle vehicle according to claim 2, wherein side openings are provided at opposite end portions of the front cover in a vehicle widthwise direction, that are positions obliquely sidewardly and rearwardly of the recessed portion, in such a manner so as to be directed obliquely rearwardly and sidewardly of the vehicle body.

5. The air guide structure for a saddle vehicle according to claim 1, wherein a garnish that configures the front cover is fastened to the stepped portion.

6. The air guide structure for a saddle vehicle according to claim 2, wherein a garnish that configures the front cover is fastened to the stepped portion.

7. The air guide structure for a saddle vehicle according to claim 3, wherein a garnish that configures the front cover is fastened to the stepped portion.

8. The air guide structure for a saddle vehicle according to claim 3, wherein the side openings include a plurality of fins directed in the vehicle widthwise direction.

9. The air guide structure for a saddle vehicle according to claim 1, wherein the stepped portion is formed in an arc convex rearwardly as viewed in plan.

10. The air guide structure for a saddle vehicle according to claim 2, wherein the stepped portion is formed in an arc convex rearwardly as viewed in plan.

11. The air guide structure for a saddle vehicle according to claim 3, wherein the stepped portion is formed in an arc convex rearwardly as viewed in plan.

12. The air guide structure for a saddle vehicle according to claim 5, wherein a fastening section provided on the stepped portion to the garnish overlaps with the windscreen as viewed in front elevation.

13. The air guide structure for a saddle vehicle according to claim 2, wherein upper edges of opposite end portions of the stepped portion in the vehicle widthwise direction are formed at a highest position.

14. An air guide structure for a saddle vehicle comprising:
a windscreen is mounted at a front portion of a vehicle body;
an inlet port is provided between a central portion of a front end of the windscreen and a front cover, for guiding a flow of air to a rear of the windscreen;
a stepped portion is formed stepwise in a forward and backward direction on an upper face of the front cover in an inside of the inlet port; and
a recessed portion is provided at a central portion of the stepped portion in a vehicle widthwise direction;
wherein a flow of air is guided to a rear of the windscreen for reducing a negative pressure formed behind the windscreen.

15. The air guide structure for a saddle vehicle according to claim 14, wherein an opening is provided on the front cover behind the recessed portion in such a manner so as to be directed rearwardly of the vehicle body.

16. The air guide structure for a saddle vehicle according to claim 14, wherein side openings are provided at opposite end portions of the front cover in a vehicle widthwise direction that are positioned obliquely sidewardly and rearwardly of the recessed portion in such a manner so as to be directed obliquely rearwardly and sidewardly of the vehicle body.

17. The air guide structure for a saddle vehicle according to claim 14, wherein a garnish that configures the front cover is fastened to the stepped portion.

18. The air guide structure for a saddle vehicle according to claim 16, wherein the side openings include a plurality of fins directed in the vehicle widthwise direction.

19. The air guide structure for a saddle vehicle according to claim 14, wherein the stepped portion is formed in an arc convex rearwardly as viewed in plan.

20. The air guide structure for a saddle vehicle according to claim 15, wherein upper edges of opposite end portions of the stepped portion in a vehicle widthwise direction are formed at a highest position.

* * * * *